Nov. 7, 1967  M. J. VADROT  3,351,162
ELECTROMAGNETIC BRAKING MECHANISM
Filed Feb. 14, 1966  4 Sheets-Sheet 2
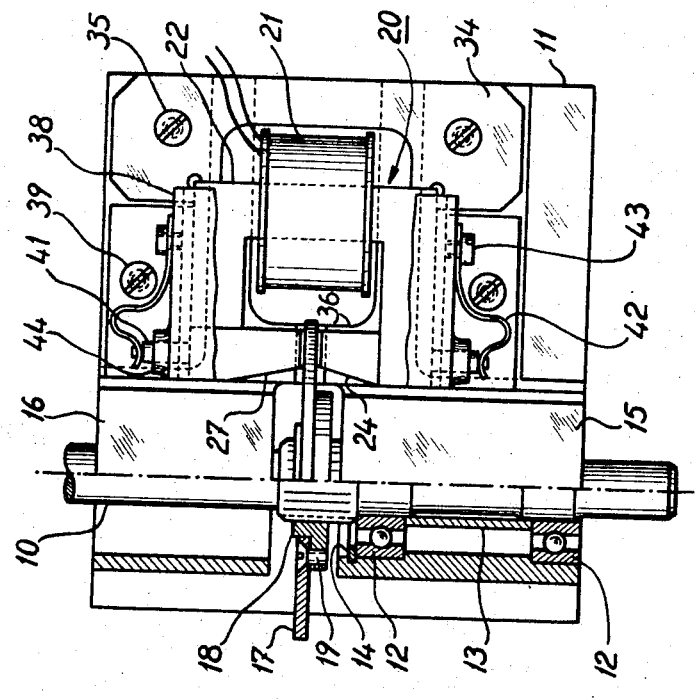
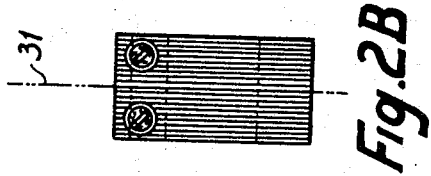
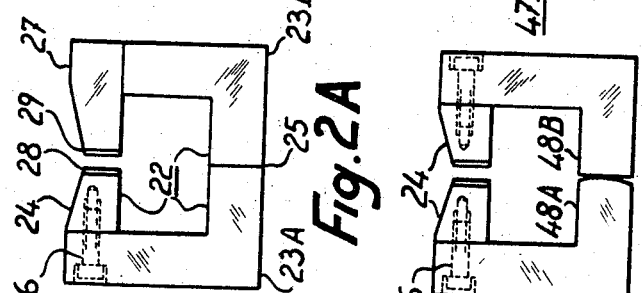
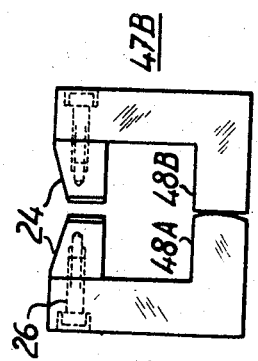
Inventor:
Michel Jacques Vadrot
BY Baldwin & Wight
Attorneys Nov. 7, 1967     M. J. VADROT     3,351,162
ELECTROMAGNETIC BRAKING MECHANISM
Filed Feb. 14, 1966     4 Sheets-Sheet 3
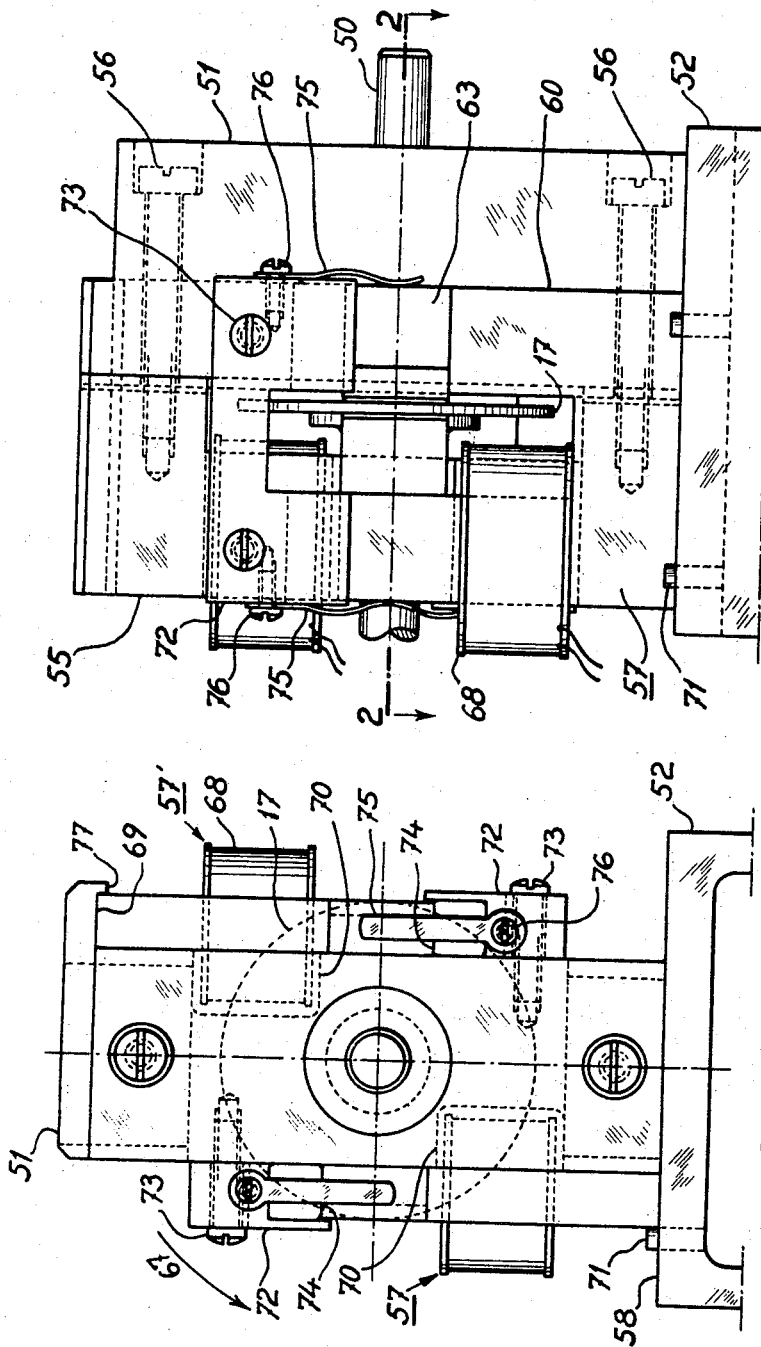
Inventor:
Michel Jacques Vadrot
BY Baldwin & Wight
Attorneys Nov. 7, 1967   M. J. VADROT   3,351,162
ELECTROMAGNETIC BRAKING MECHANISM
Filed Feb. 14, 1966   4 Sheets-Sheet 4
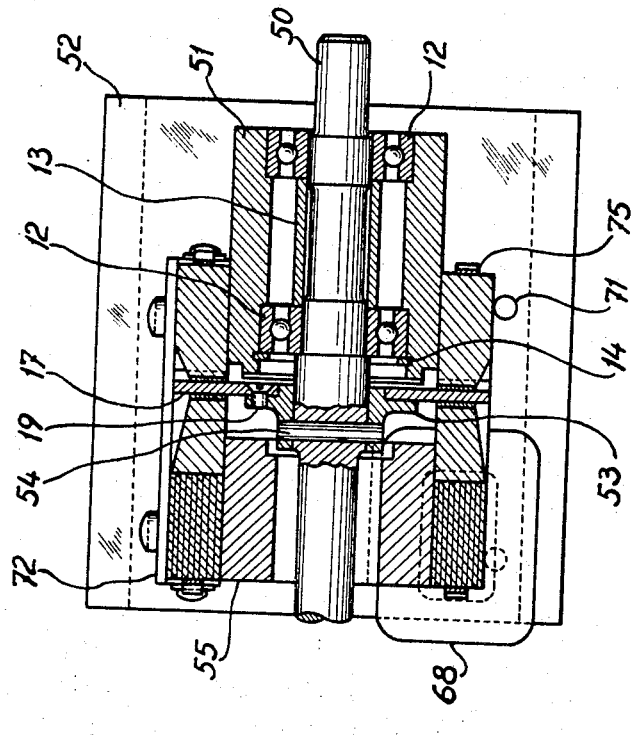
Inventor:
Michel Jacques Vadrot
By Baldwin & Wight
Attorneys

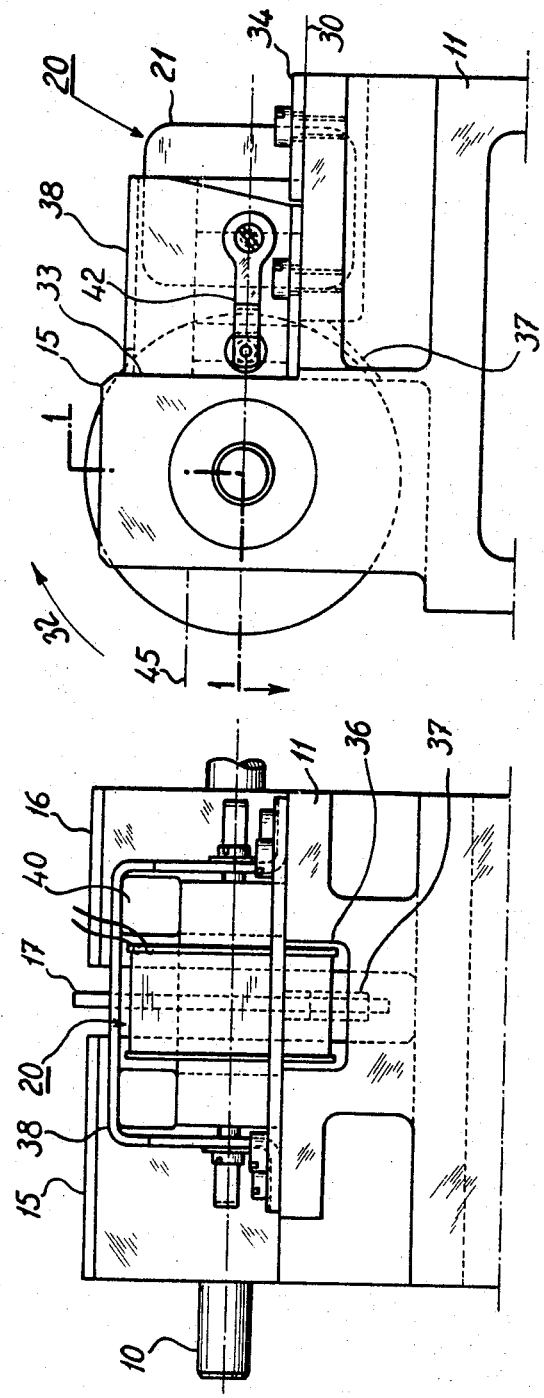

United States Patent Office 3,351,162
Patented Nov. 7, 1967

3,351,162
ELECTROMAGNETIC BRAKING MECHANISM
Michel Jacques Vadrot, Paris, France, assignor to Societe Industrielle Bull-General Electric (Societe Anonyme), Paris, France
Filed Feb. 14, 1966, Ser. No. 527,003
Claims priority, application France, Mar. 10, 1965, 8,614, Patent 1,436,002
8 Claims. (Cl. 188—164)

ABSTRACT OF THE DISCLOSURE

For rapidly stopping a movable flat member or rotative disc, an electromagnetic brake comprises an electromagnet structure, the general form is that of a substantially flat horseshoe and which is made of a two-element yoke whose pole pieces are maintained in contact with said member or disc. The positioning of said yoke permits conciliating a high braking force with a low response time.

---

This invention relates to improvements in electromagnetically actuated braking devices.

For stopping a rotational movement, it has already been proposed to employ a braking device in which no harmful air gap exists in the magnetic circuit of the electromagnet at any instant, and in which the said magnetic circuit includes a disc fast with the shaft to be stopped. This advantageous arrangement arises out of the application, to at least one of the pole pieces of the electromagnet, of a friction lining having high magnetic permeability and remarkable friction properties. This lining, in the form of a thin welded layer, may consist of a mixture, in different proportions, of polytetrafluoroethylene and chromised iron powder, the grain size of which has been carefully chosen.

In an arrangement designed for feeding and stopping the paper in a printing machine, the magnetic circuit of the electromagnet is formed of the disc fast with a rotatable shaft, a toroidal casing containing the exciter coil and magnetic friction packings. This arrangement has disadvantages. For example, the mounting and demounting of the component parts are fairly complicated operations. The cooling of the friction parts is not entirely satisfactory and it is not easy to change the mechanical and electromagnetic characteristics of the parts employed. Further, as a laminated magnetic circuit is practically not usable in a toroidal braking device eddy currents are opposed to the obtention of a minimal response time.

The invention has for its object to obviate or minimize these disadvantages by a new design. It has an extended field of application since it is sufficient for the moving part which is to be braked and stopped to have a portion with two parallel faces, which can be included in a closed magnetic circuit.

More precisely, there is provided a braking device for rapidly stopping an initially moving member, which member possesses a part of ferrous metal having two parallel faces, with an electromagnet comprising an electromagnet body arranged to form a magnetic circuit including the said part having parallel faces of the member to be stopped, wherein the body is composed at least of two elements disposed on a support adapted to receive a braking effort, these two elements forming a substantially flat horseshoe, with at least a first element surrounded by the exciter coil, the two elements each comprising a pole piece, and these two pole pieces being adapted to move in relation to one another on either side of the part to be stopped, and wherein there are provided means which act on the said pole pieces in order to maintain them constantly in contact with the part to be stopped.

Preferably, but not necessarily, the friction faces of the pole pieces of the electromagnet are provided with a lining consisting of a mixture of polytetrafluorethylene and chromised iron powder, which combines high magnetic permeability with a remarkable constant coefficient of friction and complete lack of binding tendency.

For a better understanding of the invention and to show how it may be carried into effect, the same will now be described, by way of example, with reference to the accompanying drawings, in which:

FIGURES 1A, 1B and 1C are a front view, a side view and a plan view respectively of a gripper-type brake according to a first embodiment of the invention;

FIGURES 2A and 2B are two fragmentary views of the electromagnet body employed in the first embodiment;

FIGURE 3 illustrates a modified construction of the body illustrated in FIGURES 2A and 2B;

FIGURES 4A, 4B and 4C are a side view, a front view and a plan view respectively of a gripper-type brake according to a second embodiment of the invention; and FIGURES 5A, 5B and 5C are three fragmentary views of the electromagnet body employed in the second embodiment.

Reference will be made to FIGURES 1A to 1C in order to examine a braking device called a "radial gripper-type brake," which expression will be explained a little later.

The shaft 10 is adapted to turn in the base 11 of the machine. It will be assumed that the shaft 10 is intended to control the intermittent feed advance of a paper web in a printing machine. There will be seen in FIGURE 1C a fragmentary section along the line 1—1 of FIGURE 1B. Two ball bearings 12, a crosspiece 13 and a resilient stop ring 14 serve to position the shaft 10 in the recesses machined in the straight upright 15 of the base 11. It will be assumed that the left-hand end (FIGURE 1A) of the shaft 10 is coupled by any appropriate means to a paper driving device proper. Since these means and this device do not form part of the invention, it has not been necessary to show them. It will also be assumed that the other end of the shaft 10 is coupled to an appropriate clutch device, which may be associated with an electric motor which is operative during the operation of the machine.

The brake disc 17, consisting of soft steel or iron, is connected to the hub 18 by a number of screws 19. The hub 18 preferably consists of a non-magnetic metal. Its central hole is formed with grooves corresponding to those in the shaft 10. It follows that the disc 17 can slide axially on the shaft 10, but cannot turn in relation thereto.

The gripper-type brake 20 consists of an electromagnet, which comprises an exciter coil 21 coupled to the electromagnet yoke or body. The latter, which is separately shown in FIGURES 2A and 2B, comprises a first element 22, which is formed of a laminated circuit in two parts 23A, 23B and of a pole piece 24. The two parts 23A, 23B are obtained by adhesive bonding of thin silicon-containing soft steel or iron laminations. They are brought to the exact required dimensions and geometrical form by a final trueing. The break 25 is necessary to enable the coil to be threaded on to the first element. There are then two possibilities: either the joint 25 is not bonded, or the two portions 23A and 23B are bonded after the coil has been threaded on, provided however that the air gap at the joint 25 remains very narrow. The pole piece 24, which consists of non-laminated soft steel or iron, is secured to the laminated part 23A by two screws 26.

The second element of the body is merely formed of the pole piece 27 consisting of non-laminated soft steel or iron. The pole piece 27 is not secured to the laminated part 23B, so that it can slide on the upper face of this part 23B in the direction of the pole piece 24. Each of the pole pieces 24 and 27 is provided with a friction lining such as 28 and 29. These linings may be composed of a mixture of chromised iron powder and P.T.F.E. (which stands for polytetrafluorethylene). The advantages of this material are: possibility of welding to steel in a layer not exceeding 0.3 mm. in thickness after machining, stable coefficient of friction exceeding 0.3, and substantially no wear.

It will be seen (FIGURE 1C) that the gripper-type brake 20 is so positioned that the pole pieces 24 and 27 are situated on either side of the disc 17 and as far as possible from the axis of rotation of the disc. The body of the electromagnet rests on a plane surface 30 (FIGURE 1B) machined on the base 11. The level of this surface is such that the plane of symmetry 31 (see FIGURE 2B) extends through the axis of rotation of the brake disc. It is for this reason that the gripper-type brake is referred to as of the "radial" type. In addition, the disc 17 turns in the direction of the arrow 32.

The means for positioning the gripper-type brake are adapted to be automatically centered in relation to the faces of the disc. In a horizontal plane, the side of the pole pieces is guided by the vertical face 33 of the uprights 15 and 16 and of the base, and the other side of the body is guided by the plate 34. The latter is secured to the base 11 by two screws 35. The said plate comprises keys for approximately guiding the corners of the laminated circuits 23A and 23B, i.e. a certain freedom of movement must exist. The holes for the passage of the screws 35 must be sufficiently large to permit adjustment of the position of the plate 34.

The recess 36 machined in the base serves to receive that portion of the coil 21 which is situated below the surface 30. A slot 37 in the base 11 allows the passage of the disc 17.

The means for positioning the gripper-type brake are completed by a stirrup 38, for example of bent sheet metal, which is secured by two screws 39. Two rubber blocks 40 (FIGURE 1A) are disposed between the web of the stirrup 38 and the top of the body of the electromagnet. These blocks must not be too highly compressed, in order that they may not interfere with the centering of the electromagnet. Disposed on each side of the stirrup 38 is a stud 41 and a leaf spring 42 secured by a screw 43. Each stud is adapted to slide in a hole in a wall of the stirrup, the guiding length being increased by a cap 44, which may be brazed to the stirrup 38.

Thus, the only forces which urge the pole pieces 24 and 27 towards the corresponding faces of the disc 17 are those emanating from the springs 42. The frictional forces resulting therefrom when the disc rotates are negligible. When a strong direct current is passed through the winding of the exciter coil, the force attracting the pole pieces operates rapidly by reason of the fact that the pole pieces substantially have not been displaced. The braking action therefore also takes place rapidly and always uniformly in the course of the repeated braking operations, by reason of the fact that the pressures exerted on the two faces of the disc are always well balanced.

Since the electromagnet is situated completely outside the disc, it will readily be appreciated that there is a great freedom of choice in regard to the dimensional and electromagnetic characteristics of the braking device, depending upon the desired stopping time and the inertia of the parts to be braked. This freedom is reduced in the case of a toroidal braking device, wherein it is very difficult to cut the iron volume when a shorter response time is desired.

The foregoing description has only referred to the association of a single gripper-type brake with the brake disc. It is obvious that a number of such gripper-type brakes could be provided if the required braking torque cannot be achieved with a single gripper-type brake. For example, a second gripper-type brake could readily be provided opposite to the first one.

It will be obvious from FIGURE 1B that the second gripper-type brake must be mounted symmetrically in relation to the first one and that a horizontal surface must be provided at the level 45. This surface may be supplied by a fitted block, for example secured by screwing, on the upper face of the uprights 15 and 16. It is this block which receives the braking effort, which in this case is upwardly directed. The gripper-type brake must then be suspended by an assembly of members which enables it to be automatically centered in the same way as the first gripper-type brake. For this purpose, it is sufficient to employ the same parts 34, 35 and 38 to 44 which have previously been described, and which have been designed for this purpose, and to secure them to the block in question.

FIGURE 3 illustrates another form of construction of the body of the electromagnet. It may be stated that the latter is now articulated. It is composed of two almost identical elements 47A, 47B, each of which comprises a laminated portion 48A, 48B, and a non-laminated pole piece 24 secured by two screws 26. One end of the laminated portion 48A comprises a rounded surface in order that the angle between the two elements may vary when the magnetic friction linings have undergone a certain amount of wear. A form of air gap is created between these two ends of the portions 48A, 48B, but this air gap is scarcely troublesome, since it is situated within the exciter coil 21. It is advantageous for the external dimensions of this body to be the same as those of the body illustrated in FIGURES 2A, 2B, in order that the same securing members, bearing the references 34, 35 and 38 to 44, may be employed.

Of all the other possible constructional forms, there has been illustrated in FIGURES 4A to 4C a second typical construction in which each of the two gripper-type brakes is of the "tangential" type. In accordance with FIGURE 4C, which is a section along the line 2—2 of FIGURE 4B, the shaft 50, which performs the same function as the shaft 10 previously seen, is adapted to turn in the upright 51 of the base 52, by means of two ball bearings 12, the bush or sleeve 13 and the resilient stop ring 14. This time, the brake disc 17 is completely fast with the shaft 50. It is secured to the hub 53 by screws 19. The said hub is held fast on the shaft 50, for example by means of the pin 54. Consequently, the disc 17 cannot move axially in relation to the shaft 50.

The means for supporting the gripper-type brakes are completed by a detachable upright 55. This upright, which has the same thickness as the upright 51, is formed with a recess (FIGURE 4B) sufficiently large for the passage of the disc and its hub. The lower and upper parts of the upright 55, and the upright 51 are assembled by a tenon-and-mortise joint (FIGURE 4C). After the positioning of the shaft 50 supporting the hub 53 and the disc 17, the upright 55 is gripped on the upright 51 by means of screws 56.

A first gripper-type brake 57 (FIGURE 4A) rests on a horizontal surface 58 of the base 52. The second gripper-type brake 57', which is identical to the first one, must be suspended. Each gripper-type brake consists of an electromagnet which comprises an exciter coil 68 coupled to an electromagnet body. The latter, which is separately shown in FIGURES 5A to 5C, comprises a first element 59, which is formed of a laminated circuit 60 and of a pole piece 61 consisting of non-laminated iron or soft steel. Two screws 62 serve to secure the pole piece 61 with the laminated circuit 60 when the coil 68 has been threaded on to the left-hand leg of the laminated circuit 60.

The second element is merely formed of a pole piece 63 of non-laminated iron or soft steel. The pole piece 63 is not secured to the right-hand leg of the laminated circuit 60, so that it can slide on the upper surface of this leg in the direction of the pole piece 61. Each of the pole pieces 61, 63 is provided with a friction lining, such as 64, 65. It may be seen from FIGURE 5C that one side of each of the pole pieces 61, 63 is obliquely cut. The friction surfaces of the pole pieces are thus reduced in relation to the surface of the transverse cross-section of the laminated circuit. It is known that, as a result of this reduction, the unit attractive force of the pole pieces is increased, for a given magnetic inducton.

The gripper-type brake 57 is of the "tangential" type, because the plane of approximate symmetry 66 (FIGURE 5B) is situated in a plane parallel to the plane extending through the axis of rotation of the disc 17. When a sufficiently strong direct current is passed into the winding of the exciter coil 68, the attractive force tends to bring the pole pieces 61 and 63 towards the faces of the disc 17. Since the latter rotates in the direction indicated by the arrow 67, the braking effort resulting therefrom applies the electromagnet to the surface 58 of the base 52. With regard to the gripper-type brake 57', the braking effort tends to move it upwards. In this case, the electromagnet of the gripper-type brake 57' abuts the surface 69 afforded by latteral extensions of the uprights 51 and 55.

The upright 55 is formed with two grooves 70, each of which provides a passage for that portion of the coil 68 which projects beyond one side of the body of each electromagnet.

In its lower part, the body of the gripper-type brake 57 is maintained close to the vertical faces of the uprights 51, 55 by two studs 71 fitted in the base. A fish plate 72 serves to maintain the upper portion of the electromagnet. The said fish plate is secured to the uprights by two screws 73 and is recessed (FIGURE 4B) to permit the passage of the disc 17. Two rubber blocks 74 are disposed between the fish plate 72 and the upper portion of the body. A leaf spring 75 is secured to each end of the fish plate 72 by a screw 76. The two elements of the body are therefore constantly urged towards the corresponding faces of the disc 17 by the ends of the leaf springs 75.

The rubber blocks 74 must not be too highly compressed and sufficient freedom of movement must be provided in the guide studs 71 to enable the electromagnet to shift in a direction parallel to the axis of rotation of the brake disc. Consequently, the gripper-type brake automatically positions itself correctly in relation to the disc. It will be seen that the same members 72 to 76 are employed to support and maintain in position the gripper-type brake 57', the body of which is guided at its upper end by the ledge 77 provided on the extensions of the uprights 51 and 55.

It is to be noted that it would not be necessary to provide fitted-on linings (such as 28, 29, FIGURE 2A, and 64, 65, FIGURE 5A) if there were available for the manufacturer of the pole pieces 24, 27 and 61, 63 a solid material having frictional and magnetic properties comparable to those of the previously indicated mixture of iron powder and P.T.F.E.

The means which have been described with reference to the two embodiments for maintaining the pole pieces of the gripper-type brakes constantly in contact with the faces of the brake disc are not the only ones which could be employed. Instead of the resilient spring force, there could be utilised for this purpose a current continuously flowing through the exciter windings of the electromagnets, the strength of this current obviously being limited in order not to create an undesirable braking torque when the disc is to rotate.

The braking devices which have been described are not limited to co-operation with a rotative disc. They may be associated with a thin strip of magnetic metal, which may be endless and stretched over two drums or other rotating members. Further modifications or adaptations may be made by the person skilled in the art.

I claim:
1. A braking mechanism for rapidly stopping a movable member which has a flat part made of a ferrous metal and with two parallel faces, comprising:
an electromagnet structure including an actuating coil and a two-element yoke, these two elements forming a flat and substantially closed ring and having each a solid pole piece, both of said pole pieces being displaceable toward each other on each side of the member to be stopped, at least one of the yoke elements being formed of stuck thin laminations and being engaged in said coil, both yoke elements being substantially similar and symmetrical, the extremities of these elements being so shaped as to form an articulated junction lying inside said actuating coil,
supporting and locating means adapted to locate said electromagnet structure so that the middle plane of said pole pieces is substantially perpendicular to the faces of said movable member and to receive the braking force from both of said pole pieces, and
urging means arranged for acting upon said pole pieces to maintain the latter in contact with the said member to be stopped.
2. A braking mechanism as claimed in claim 1, wherein a flat lining made of a sintered mixture of polytetrafluoroethylene and of chromized iron powder is fixed on the rubbing face of each of said pole-pieces.
3. A braking mechanism for rapidly stopping a movable member which has a flat part made of a ferrous metal and with two parallel faces, comprising:
an electromagnet structure including an actuating coil and a two-element yoke, these two elements forming a flat and substantially closed ring and having each a solid pole piece, both of said pole pieces being displaceable toward each other on each side of the member to be stopped, a first one of the yoke elements being in part formed of stuck thin laminations and being engaged in said coil, the second of said yoke elements being merely constituted by the second solid pole piece, which has a plane face which permits its displacement while contacting an extremity of the laminated part of the first yoke element, supporting and locating means adapted to locate said electromagnet structure so that the middle plane of said pole pieces is substantially perpendicular to the faces of said movable member and to receive the braking force from both of said pole pieces, and
urging means arranged for acting upon said pole pieces to maintain the latter in contact with said member to be stopped.
4. A braking mechanism as claimed in claim 3, wherein a flat lining made of a sintered mixture of polytetrafluoroethylene and of chromized iron powder is fixed on the rubbing face of each of said pole-pieces.
5. A braking mechanism for rapidly stopping a rotative shaft rotatively integral with a flat braking disc made of a ferrous metal, comprising:
an electromagnet structure which includes an actuating coil and a two-element yoke, these two elements forming a flat and substantially closed ring and having each a solid pole piece, both of said pole pieces being displaceable toward each other on each side of said disc, at least one of the yoke elements being formed of stuck thin laminations and being engaged in said coil, both yoke elements being substantially similar and symmetrical, the extremities of these elements being so shaped as to form an articulated junction lying inside said actuating coil,
supporting and braking means adapted to locate said electromagnet structure so that the middle plane of said pole pieces is substantially perpendicular to the faces of said disc and to receive the braking force from both of said pole pieces, and urging means arranged for acting upon said pole pieces to maintain the latter in contact with the faces of said disc.

6. A braking mechanism as claimed in claim 5, wherein said supporting and locating means are arranged so that the symmetry plane of said electro-magnet yoke substantially coincides with the rotation axis of said braking disc.

7. A braking mechanism for rapidly stopping a rotative shaft rotatively integral with a flat braking disc made of a ferrous metal, comprising:

an electromagnet structure which includes an actuating coil and a two-element yoke, these two elements forming a flat and substantially closed ring and having each a solid pole piece, both of said pole pieces being displaceable toward each other on each side of said disc, a first one of the yoke elements being in part formed of stuck thin laminations and being engaged in said coil, the second of said yoke elements being merely constituted by the second solid pole piece, which has a plane face which permits its displacement while contacting an extremity of the laminated part of the first yoke element, supporting and locating means adapted to locate said electromagnet structure so that the middle plane of said pole pieces is substantially perpendicular to the faces of said disc and to receive the braking force from both of said pole pieces, and urging means arranged for acting upon said pole pieces to maintain the latter in contact with the faces of said disc.

8. A braking mechanism as claimed in claim 7, wherein said supporting and locating means are arranged so that the symmetry plane of said electro-magnet yoke is distant from and parallel to the rotation axis of said braking disc.

References Cited
UNITED STATES PATENTS

| | | | |
|---|---|---|---|
| 1,812,190 | 6/1931 | Baseler | 188—164 X |
| 2,112,686 | 3/1938 | Barton | 188—164 X |
| 2,131,888 | 10/1938 | Harris. | |
| 3,280,945 | 10/1966 | Spalding | 188—202 |

DUANE A. REGER, *Primary Examiner.*